United States Patent

Comenetz

[15] 3,636,228
[45] Jan. 18, 1972

[54] APPARATUS FOR MONITORING ARC ROTATION ON AN ELECTRODE

[72] Inventor: George Comenetz, Pittsburgh, Pa.
[73] Assignee: Westinghouse Electric Corporation, Pittsburgh, Pa.
[22] Filed: Sept. 4, 1970
[21] Appl. No.: 69,669

Related U.S. Application Data

[63] Continuation-in-part of Ser. No. 564,341, July 11, 1966, abandoned.

[52] U.S. Cl. ...................13/12, 340/164, 340/213, 340/220, 13/9
[51] Int. Cl. ...................H05f 7/18, F27d 11/10
[58] Field of Search ...................340/213; 13/9, 12

[56] References Cited

UNITED STATES PATENTS 3,371,141  2/1968  Corso .......................... 13/12
3,378,621  4/1968  Kemeny ........................ 13/9

*Primary Examiner*—Thomas B. Habecker
*Attorney*—A. T. Stratton, C. L. McHale and M. I. Hull

[57] ABSTRACT

A transducer, which may be responsive to vibration, sound, light, stress, or a magnetic field, is mounted on or in the electrode, and produces a signal which increases in intensity when the arc, or current filaments in the electrode supplying the arc, pass near the transducer. Where alternating current supplies the arc, comparison circuit means compares the transducer output signal in time with the 60 cycle or other frequency alternating current supplying the arc, and if a transducer signal is not produced once per alternation, or once per cycle, the comparison circuit supplies an output signal to utilization means which may shut off the arc current, give an alarm, increase the strength of the magnetic field exerting a force on the arc to cause it to rotate, or be used for other purposes. Where direct current produces the arc, the comparison circuit means produces a time duration reference signal. In some embodiments, the transducers are sealed in a moisture proof manner and mounted within a fluid passageway within the electrode; fluid passageways are provided to conduct heat flux from the arcing surface or electrode tip. In another embodiment, three transducers circumferentially spaced 120° from each other provide three signals to a comparison circuit; as long as the three signals, or if desired, two of the three signals occur with reasonable symmetry with respect to time, the arc is deemed to be rotating normally; when the symmetry is no longer present, the comparison circuit supplies an output to utilization means.

24 Claims, 9 Drawing Figures

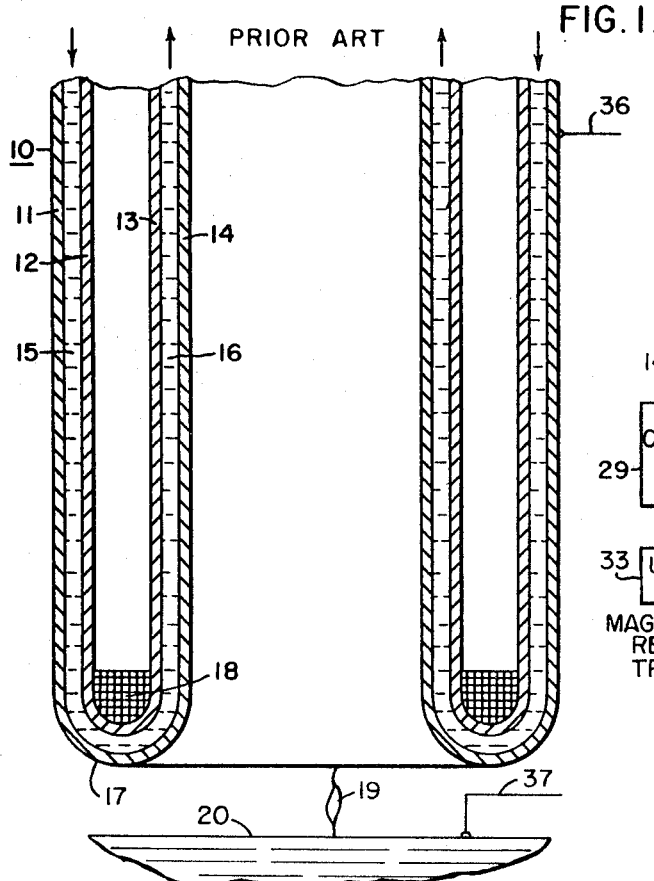
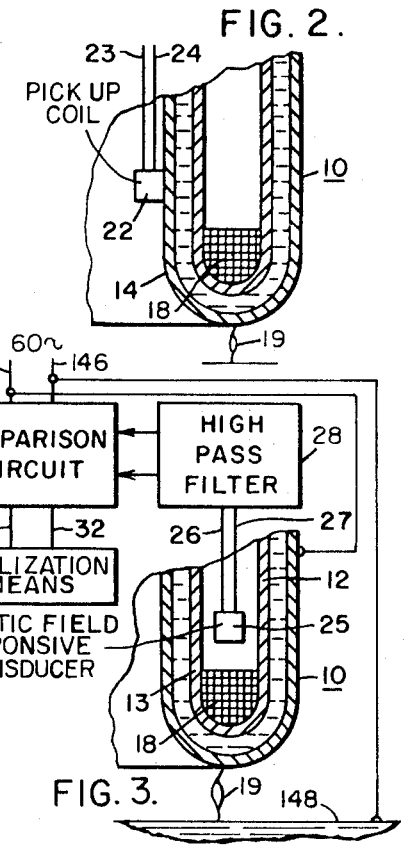
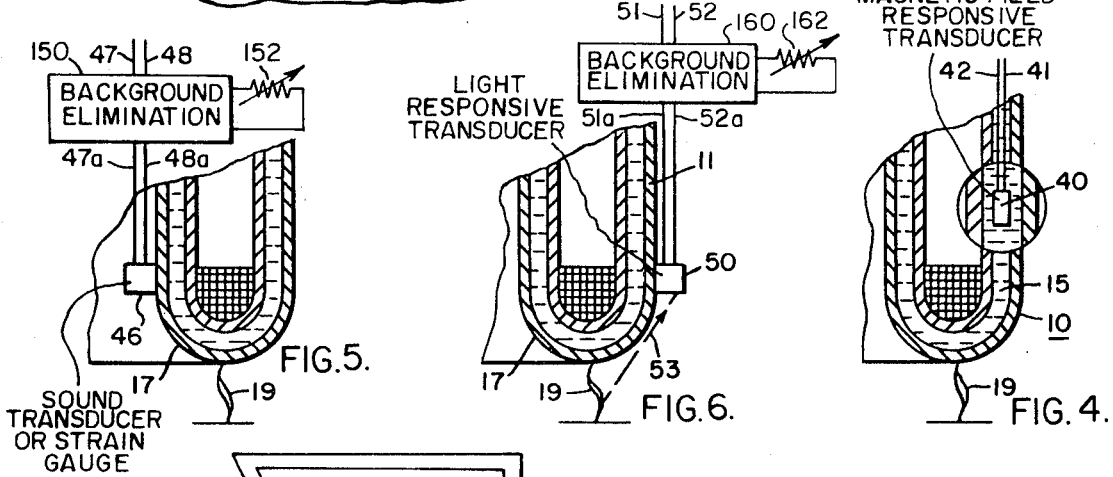
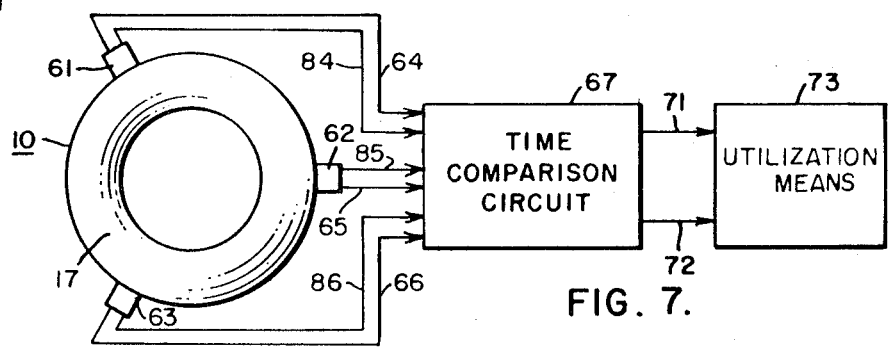

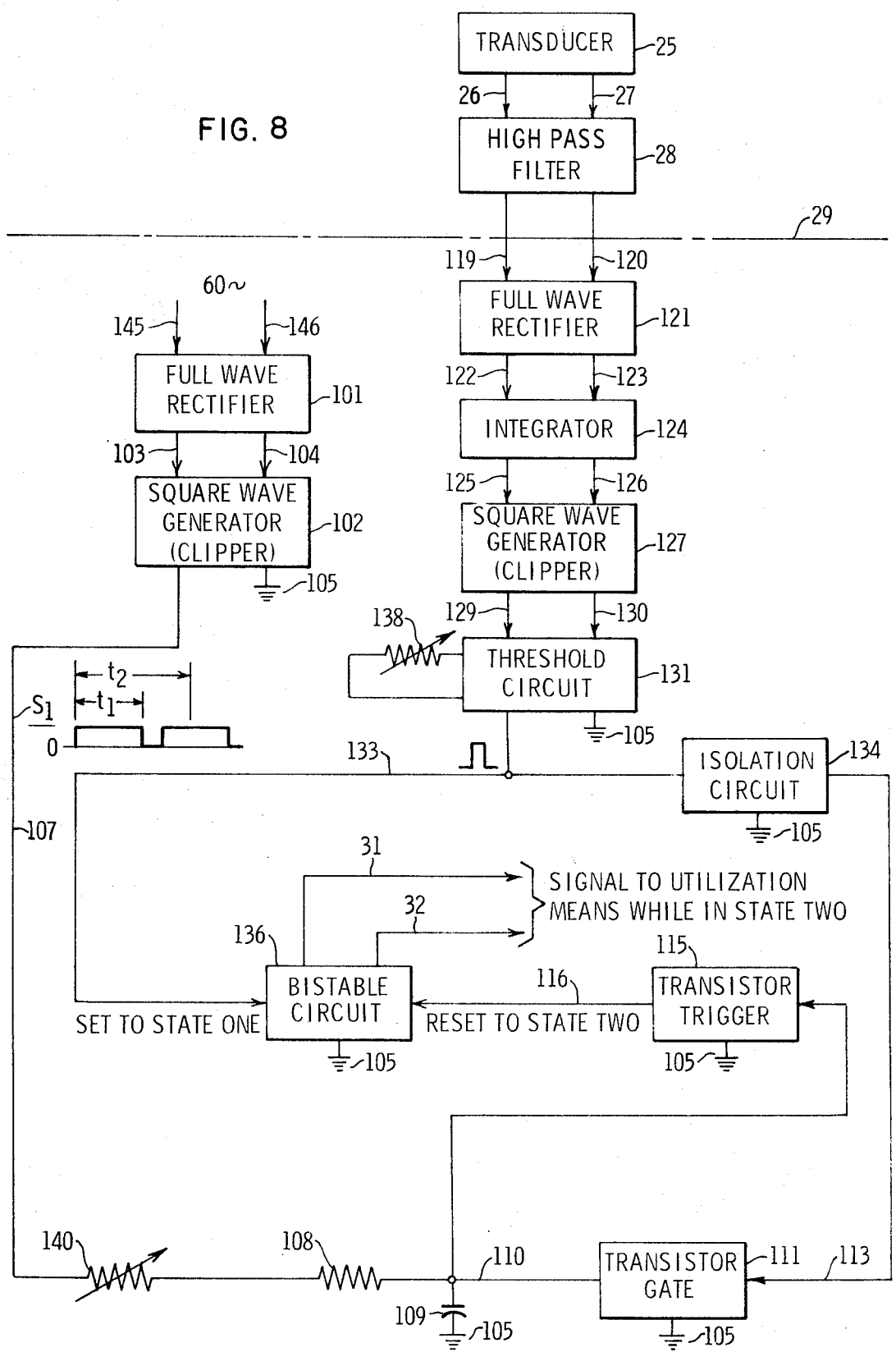

3,636,228

APPARATUS FOR MONITORING ARC ROTATION ON AN ELECTRODE

CROSS REFERENCE TO RELATED APPLICATIONS

This application is a continuation-in-part of copending application Ser. No. 564,341, filed July 11, 1966, now abandoned.

FIELD OF THE INVENTION

The invention relates to improved apparatus for monitoring arc movement, and more particularly to improved apparatus for monitoring arc rotation on a fluid cooled electrode when used in a furnace.

Water or other fluid cooled, nonconsumable electrodes incorporating means for generating a magnetic field to cause the arc to rotate at high speed about the electrode tip have been developed for the arc melting or metals. Three such electrodes may be employed connected to a three phase source and mounted above the surface of a crucible loaded with scrap metal, the arc current of each electrode being, for example, 80,000 amperes, to melt down the charge. The bottom tip of the electrode is of a material having high electrical conductivity and good thermal conductivity, for example, copper, and the arc extends downward from the electrode tip to the melt.

DESCRIPTION OF THE PRIOR ART

In one prior art apparatus, the hollow interior of the tip contains a magnetic field coil coaxial with the electrode which coil carries a large direct current which maintains a steady magnetic field which, just beneath the tip, is radial in direction and of a magnitude of, for example, several thousand gauss. This causes the point of attachment of the arc to rotate rapidly around the arcing surface or generally annular electrode tip, the direction of motion reversing when the arc current reverses in polarity at each half cycle, where a direct current is used in setting up the magnetic field and alternating current produces the arc. The speed of the arc is at least in part a function of the square root of the magnetic field strength and at least in part a function of the square root of instantaneous arc current. Because of instant variations in the arc current during each alternations, repetitive arc paths as the arc rotates may occur in a closed arc track of some width of the arcing surface. Thus the speed of rotation varies during an alternation of the 60 cycle supply current. A typical rotational speed for an arc of the character described would be an average rotational frequency of the order of 1,000 times per second.

If for any reason the arc stops rotating, there is danger of an almost immediate melting of the electrode tip by the intensely hot arc spot, and this danger exists even though the tip is of water-cooled copper and the fluid flowing through the tip is adequate to conduct away normal heat fluxes caused by the arc spot and also by convection and radiation from the arc and melt. Rotation is likely to stop, for example, if a ferromagnetic bar or plate in the charge of scrap is attracted by the direct current field and lodges against the electrode tip in such a position as greatly to weaken the field along part of the circumference of the tip. An additional hazard is that bits of material from the melt will splash up on the tip or be attracted to the tip so that after a period of time, there is a deposit of ferromagnetic material on the tip which weakens the magnetic field to the point where it will no longer rotate the arc.

The prior art includes U.S. Pat. No. 3,371,141, issued Feb. 27, 1968 to S. M. DeCorso et al. for "Arc Rotation Detector" and assigned to the assignee of the instant invention.

SUMMARY OF THE INVENTION

My invention is directed to apparatus for monitoring the arc rotation at the tip so that should the rotation stop or become too slow, the current to the arc can be cut off sufficiently quickly to prevent a burnthrough, with possible destruction of the electrode tip, and possible explosive effects in the furnace resulting from the discharge of cooling fluid onto the intensely hot melt.

In further summary, in one embodiment of my invention, I derive an electrical signal from a magnetic field responsive transducer which may be a pickup coil located on or in the electrode and not far above the field generating coil which sets up the magnetic field for rotating the arc. Preferably the axis of the pickup coil is in a circumferential direction. Where the electrode is composed of a plurality of concentric tubes with fluid flow passageways therebetween, such, for example, as the electrode described and claimed in the copending patent application of S. M. DeCorso for "Improved Electrode," filed Aug. 16, 1965, Ser. No. 479,965, now issued U.S. Pat. No. 3,369,067 and assigned to the assignee of the instant invention, the pickup coil may be located in the large central aperture passing through the electrode and near the electrode tip or electrode face member; the pickup coil may be located on the tube of largest diameter which forms the outer cylindrical wall of the electrode; the pickup coil may be located in one of the fluid passageways and made fluid-proof with fluid-proof leads thereto.

In other embodiments of my invention I employ a microphone located inside the hollow interior or on an outside wall of the electrode and directed so as to "hear" from one side of the electrode tip better than the other, the microphone producing a periodic signal as the arc passes nearby, the signal having a frequency within a range of frequencies as the speed of rotation varies where alternating current supplies the arc and the arc is rotating; the microphone "hearing" a substantially steady sound when there is a halted arc taking place from the electrode.

In a third embodiment, I employ a light-sensitive element such as a photocell or a photoresistor located on the electrode and receiving flashes of increased light intensity from the arc as it rotates past a given point on the electrode tip. The light-sensitive element is composed of a material which will withstand the heat of its environment. Alternatively, the light-sensitive element is protected from the heat of its environment by being enclosed in a cooled housing. The element looks through an open window in the housing. Air is supplied within the housing by an air hose, and blowing out through the window, the air protects the element against the fumes and dust of the environment.

In a fourth embodiment, I employ three transducers or detectors equally circumferentially spaced from each other about the axis of an electrode, their signals being compared in a suitable time comparison circuit, the signals having a high degree of time symmetry when the arc is rotating properly and lacking such symmetry when the arc is not rotating. The output of the time comparison circuit is utilized to operate utilization means, which may be an alarm and control device when the arc rotation stops.

BRIEF DESCRIPTION OF THE DRAWINGS

FIG. 1 shows a nonconsumable electrode in a furnace according to the prior art and having fluid means for cooling the arcing surface and field coil means for setting up a magnetic field which continually rotates the arc;

FIGS. 2, 3 and 4 show embodiments of the invention in which a pickup coil is disposed on the electrode in a manner to have a signal induced therein by the rotating arc or arc current filaments within the electrode; FIG. 3 showing an electrical circuit for supplying this signal to utilization means.

FIG. 5 shows an embodiment of the invention employing a sound transducer or strain gauge as the detecting element;

FIG. 6 shows an embodiment of the invention employing a light-sensitive device as the detector;

FIG. 7 shows a still further embodiment of my invention especially suitable for use where the arc is produced by direct current;

FIG. 8 shows a circuit, not per se part of the invention, suitable for use in the comparison circuit of FIG. 3.

In FIG. 1, which shows an electrode of the prior art, the electrode generally designated 10 has four concentric tubes 11, 12, 13 and 14 with a fluid inlet passageway 15 between tubes 11 and 12 and a fluid outlet passageway 16 between concentric tubes 13 and 14. The electrode tip, or electrode arcing surface, or electrode face portion, is designated 17. A magnetic field producing coil 18 is seen disposed near the electrode tip portion between the tubes 12 and 13, the coil 18 having leads not shown for convenience of illustration, for bringing a potential for energizing the same. Arc 19 takes place from electrode tip portion 17 to melt 20. The source of 60 cycle power to introduce and sustain the arc is symbolized by lead 36 to the electrode and lead 37 to the melt.

Figure 9:
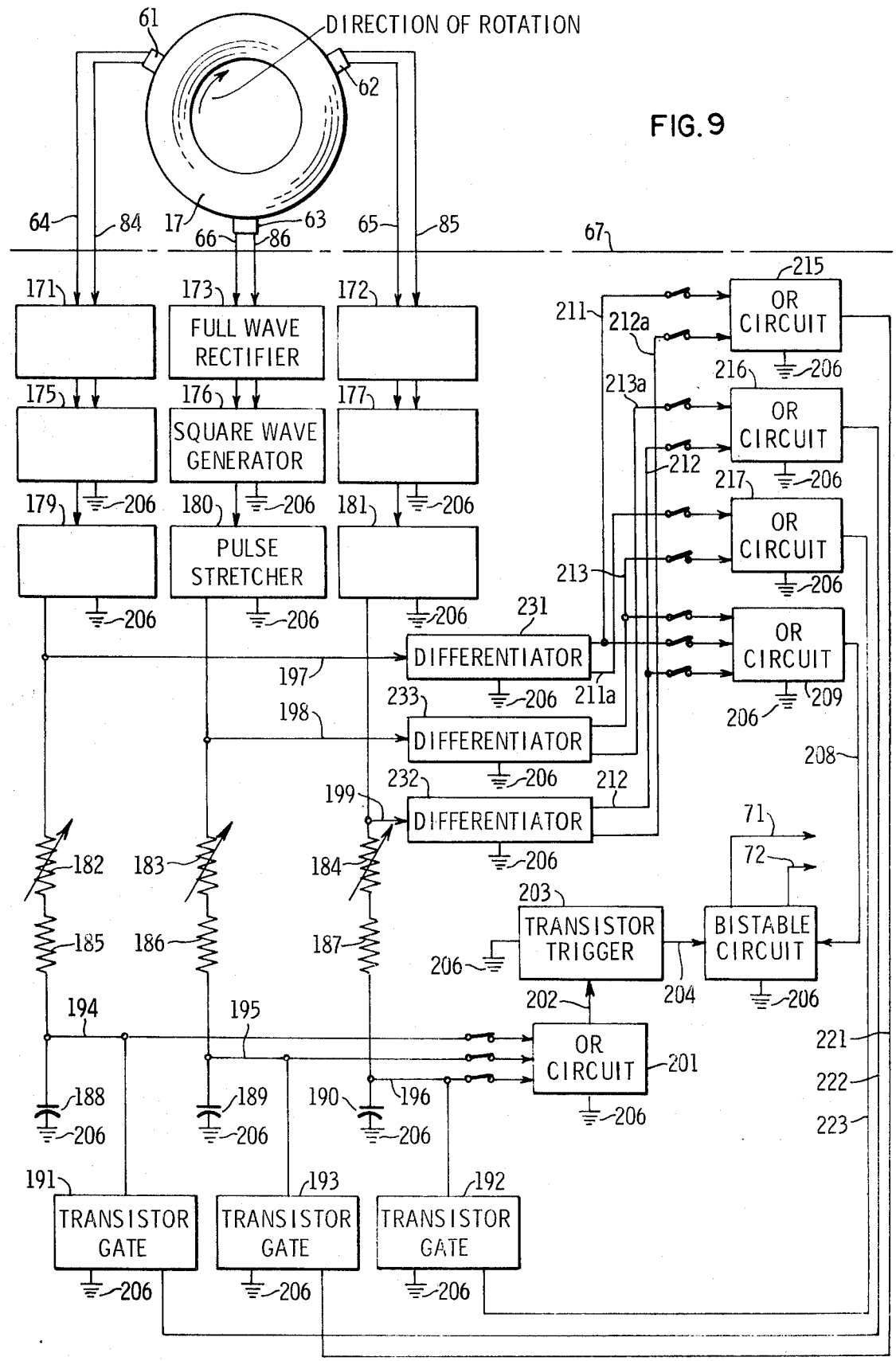
FIG. 9 shows a circuit, not per se part of the invention, suitable for use in the comparison circuit of FIG. 7.

The tip 17 is seen to be fluid cooled and by design considerations, a sufficient flow of coolant fluid can be made to pass adjacent the arcing surface to conduct sufficient heat flux away from the arcing surface at a rate which normally prevents the arcing surface from rising to a melting temperature for a substantial period of time, and this notwithstanding that the arc spot where arc 19 impinges upon portion 17 is intensely hot and would result in melting the surface or sublimation of material from the arcing surface were it to remain in any one spot for a period of time longer than a few microseconds. As will be readily understood, the arc 19 also emits radiation which heats up the arcing surface 17, and the convection of hot gases and heat from the melt 20 transfers heat flux to the arcing surface portion 17 which must be removed by the cooling fluid. Although the amount of heat flux removed is large, it can be done satisfactorily, so that the electrode can be operated continuously with large currents in the neighborhood of 80,000 amperes producing enough heat to quickly melt the melt 20.

Particular reference is made now to FIG. 2, which shows my invention according to one embodiment thereof. The electrode 10 is seen to have mounted on the wall of the inner concentric tube 14 a pickup coil 22 having leads 23 and 24 thereto. Preferably, the axis of the pickup coil is oriented to provide for the maximum signal being induced therein by the moving current of arc 19 and/or current filaments in the electrode. If arc 19 is not moving, a voltage chiefly of 60 cycles will be generated in the pickup coil 22 because, as previously stated, arc 19 is usually produced by an alternating current source of 60 cycles per second. If the arc 19 is rotating normally, there will be superimposed on the 60 cycle signal from coil 22 a signal of average frequency of the order of 1,000 cycles per second or whatever the average rate of rotation of the arc 19 is about the annular arcing surface 17. It will be understood that the speed of arc rotation is a function of magnetic field strength times instantaneous arc current; near (in-time) current zeros, the speed of rotation may be relatively slow while at current peaks during each alternation the speed may be much faster. Assuming field producing coil 18 is energized by direct current, the direction of arc rotation reverses after each AC alternation. A rotation rate of 1,000 per second is easily obtained in practice; in fact, rotation rates greater than this figure have been successfully obtained and indeed in some cases may be essential to prevent the arc spot from remaining too long in one position on the surface of electrode tip portion 17. As will be readily understood, the metallic sleeve 14 provides an effect some shielding of the pickup coil 22, but sufficient sensitivity may be obtained, including the use of amplifiers if necessary, to obtain a signal from leads 23 and 24 ample to supply to a utilization device.

For reasons not yet fully understood, experiments have shown that usable AC signals may be produced in several bands. The invention includes band-pass filters if desired.

Particular reference is made now to FIG. 3, where the electrode 10 is seen to have a pickup coil 25 disposed between concentric tubes 12 and 13 and connected by leads 26 and 27 to a high-pass filter 28 where the 60 cycle component of the signal from pickup coil 25 may be substantially eliminated. The high-pass filter 28 may also be constructed to eliminate other low-frequency components such as those arising from pickup of ripple in the direct current magnetizing current, in comparison with the much higher rotational frequency. The filtered signal from filter 28 is fed to a comparison circuit 29 which also has the 60 cycle voltage applied thereto. If the comparison circuit 29 does not "see" a peak signal voltage from filter 28 of at least a certain magnitude at least once every half cycle of the 60 cycle current, or if desired once per cycle, then the comparison circuit produces a signal on leads 31 and 32 which is fed to a utilization device 33.

Particular reference is made to FIG. 8, showing a circuit, not per se part of my invention, suitable for use in the comparison circuit shown in block form at 29. As previously stated, comparison circuit 29 develops an output signal on leads 31–32 when transducer 25 does not produce a substantial signal at least once per alternation of the alternating current (60 cycles) supplying the arc, the presence of an output signal on leads 31–32 being indicative of the cessation of arc rotation, the output signal being applied to utilization means 33.

The heart of comparison circuit 29 is a bistable multivibrator 136 which while in only one state (state two) develops a utilization signal on leads 31–32. The 60 cycle alternating current after full wave rectification and clipping to produce a square wave of uniform polarity having a duration substantially the same as one alternation is used to charge the capacitor of an RC circuit having a time constant as long as, or somewhat longer than, one alternation. If the capacitor of the RC circuit is charged without interruption for this period of time, the voltage across the capacitor rises to a value sufficient to reset the bistable to state two and produce a utilization signal; on the other hand, signals from the transducer are applied to the bistable to maintain it set to state one, and these same signals from the transducer are applied to a transistor gate connected across the capacitor of the RC timing circuit to periodically discharge the capacitor. As long as the transducer produces one substantial signal before capacitor 109 is charged to a voltage sufficient to reset bistable 136, no output signal is applied to the utilization means.

In more detail, transducer 25 may be a pickup coil responsive to the magnetic field of the arc or the field or fields of current filaments in the electrically conductive portion of the electrode structure as these filament(s) converge at the site of the arc spot on the arcing surface of the electrode. As will be readily understood by those skilled in the art, an electric arc is by nature dynamic, fluctuating, and in some cases erratic. The result of this is that the signal from the transducer is not a clearly defined pulse; it contains a 60 cycle component which is substantially eliminated by high-pass filter 28, to which the output of the transducer is applied by way of leads 26 and 27. The output of the high-pass filter is applied by leads 119 and 120 to a full wave rectifier 121. High-pass filters are old in the art; many suitable circuits are shown in a work entitled "Reference Data for Radio Engineers," 3rd. Edition, published by the Federal Telephone and Radio Corporation, 1949.

It will be understood that because of the dynamic and fluctuating nature of the arc, the output from transducer 25 may not be a well-defined signal; experimental tests have verified this. To obtain something resembling a well-defined signal, the output of full wave rectifier 121 is applied by leads 122 and 123 to an integrator 124 which integrates the output of the full wave rectifier over a short time period, long enough to obtain a signal of substantial amplitude and sufficient duration to obtain a usable pulse therefrom. The output of the integrator is applied by leads 125 and 126 to a clipper 127, where the signals are converted to substantially square wave pulses of substantially uniform amplitude.

It is to be noted that the integrator, where located in the circuit, integrates background noise as well as useful signal components. Accordingly, the output of the clipper is applied by leads 129 and 130 to a threshold circuit 131, having a threshold level set by a variable control, symbolized by variable resistor 138, to deliver an output pulse $P_1$ only when the useful signal from the transducer exceeds in amplitude the background noise components. Pulse $p_1$ is developed on lead 133 with respect to ground, and its use will be described in detail hereinafter.

The integrator, clipper, and threshold circuit may be conventional. Reference is readily available to a work entitled "Pulse and Digital Circuits" by Millman and Taub, McGraw-Hill, 1956, and to a work entitled "Basic Radio—" by Hoag, D. Van Nostrand, 1942.

The 60 cycle alternating current between leads 145 and 146, which produces arc 19 between the electrode and a conductive surface of opposite polarity 148, FIG. 3, is directly connected to comparison circuit 29. In FIG. 8, it is shown applied to full wave rectifier 101 which applies an output by leads 103 and 104 to clipper circuit 102 which clips the rectified AC voltage very near zero, 180°, and 360° phase, producing a substantially rectangular signal output on lead 107 with respect to ground 105, represented by signal $s_1$. Times $t_1$ and $t_2$ represent selected times that the signal $s_1$ may take to charge capacitor 109 to a sufficient voltage to reset the bistable 136 to state two and produce therefrom an output signal for application to utilization means 33, FIG. 3, although the invention is not limited to these times, and rheostat 140 is expressly provided for varying the time required to charge capacitor 109.

The signals or square waves on lead 107 (an amplifier may be inserted in the lead if desired) tend to charge capacitor 109 through resistors 140 and 108, the time to charge capacitor 109 to a voltage on lead 110 sufficient to operate transistor trigger 115 and apply a signal on lead 116 to reset bistable 136 to state two being equal to time duration $t_1$ or $t_2$ or some other selected time. While bistable 136 is in state two, an output is applied between leads 31 and 32 to the utilization means 33, FIG. 3. The transistor trigger 115 may be omitted if not needed.

The pulse $p_1$ on lead 133, obtained from transducer 25, is continually applied to bistable 136 to maintain it set in state one. Furthermore, this same pulse $p_1$ after passing through isolation circuit 134 is applied by way of lead 113 to a transistor gate 111 which while gated on discharges capacitor 109 through a substantially zero impedance, reducing the voltage thereon to substantially zero.

It is seen that as long as a signal from transducer 25 occurs during the charging time of capacitor 109, the bistable is never reset to state two, and no signal is applied to the utilization means.

If the arc is rotating 1,000 times per second, an exemplary rotation rate easily obtainable as stated hereinbefore, and the 60 cycle alternation lasts 1/120 second, it is seen that the transducer may supply about eight signals during the time interval of each alternation. If only one of these signals turns on transistor gate 111, no output signal will be supplied to the utilization means.

Bistable circuits, isolation circuits, transistor gates, and transistor triggers are all old in the art, suitable circuits may be found in the aforementioned works by Millman and Taub, and Hoag, and in many other standard works on pulse circuits, wave shaping, etc.

The sensitivity of the comparison circuit 29 may be varied by adjusting the value of variable resistor 140.

Adjusting all signals to the magnitudes required, as by amplification or attenuation, requires only an elementary skill in the art.

Other comparison circuits may be employed; satisfactory use of my apparatus is not limited to the circuit shown.

Where the time to charge capacitor 109 is greater than time $t_1$, preferably the square wave generator 102 has a high output impedance so that during the interval between pulses the capacitor 109 will not tend to discharge back through the square wave generator.

The apparatus of FIG. 3 may employ direct current to produce the arc 19. In such a case, in the comparison circuit of FIG. 8, a square wave pulse generator of adjustable pulse length replaces the full wave rectifier 101 and clipper 102. The pulses of the square wave pulse generator are developed on lead 107 with respect to ground 105 and utilized in the same manner as the clipped full wave rectified 60 cycle signals. The duration of the pulses establishes a time period reference, and if transducer 25 does not supply at least one signal during the time period, a signal is developed between leads 31 and 32 for application to the signal utilization means.

Particular reference is made now to FIG. 4. Electrode 10 is seen to have a small sealed pickup coil 40 disposed in the fluid channel 15 having waterproof output leads 41 and 42. In the position shown, pickup coil 40 is sensitive to the rotation of the arc 19 and arc current filaments in the conductive structure and a signal is induced in the coil which becomes maximum on each rotation of the arc as the arc nears the coil. The signal on leads 41 and 42 may be used in the same manner as the signal on leads 26 and 27 of FIG. 3. Also, the signal on leads 23 and 24 of FIG. 2 may be used in the same manner as the signal on leads 26 and 27 of FIG. 3.

Particular reference is made now to FIG. 5, where an additional embodiment of my invention is shown. The reference numeral 46 designates a sound transducer, such as a microphone, which is connected by leads 47a and 48a and a sound background elimination circuit 150 preferably having an adjustable background elimination control external to the electrode symbolized by variable resistor 152 and thence by leads 47 and 48 to suitable comparison and utilization means, not shown. The microphone 46 "hears" from one side of the electrode tip portion 17 better than from the other, and therefore has in effect a component of average frequency of for example 1,000 cycles per second for a rotating arc, with little or none for a halted arc. This component in the signal output from transducer 46 may have other unneeded components filtered therefrom, including the 60 cycle component, and may be supplied to utilization means and if desired used to turn off the current which produces the arc should rotation stop.

Particular reference is made now to FIG. 6, where apparatus for practicing my invention is shown in which a light-sensitive device 50, which may be a photocell or other light-sensitive device composed of heat-resistant material, is mounted on the outside of the outer tube 11 at a point where light may reach the photocell 50 from arc 19 by way of path 53 when the arc travels the immediate vicinity of the arcing surface 17. Alternatively, the light-sensitive element is protected from the heat of its environment by being enclosed in a cooled housing. The element looks through an open window in the housing. Air is supplied within the housing by an air hose, and blowing out through the window, air protects the element against the fumes and dust of the environment. At this moment, the light reaching the device 50 is most intense, so that the signal on leads 51a and 52a will attain maximum amplitude. This signal on leads 51a and 52a may vary periodically in accordance with the speed of rotation of the arc 19, and may be filtered to eliminate all components except the signal component resulting from the rotation of the arc. Background elimination circuit 160 eliminates background light by establishing a reference level. Preferably the reference level is adjustable by means external to the electrode, symbolized by variable resistors 162. The output from the background elimination circuit may be used in a manner similar to the signal of FIG. 3, in which the signal from the photocell is compared with a 60 cycle signal obtained from the power supply which supplies the arc current of arc 19, and if the signal on leads 51 and 52 does not go through an amplitude peak at least once for each half cycle or alternation of the 60 cycle current supplying the arc, a signal is applied to a utilization device.

Particular reference is made now to FIG. 7, which shows a bottom view of an electrode according to that of FIG. 1, having three transducers or pickup devices 61, 62 and 63 positioned at spaced circumferential intervals of 120°, with lead means therefrom 64–84, 65–85 and 66–86 respectively, to a time comparison circuit 67. The circuit of FIG. 7 is especially suitable for use where the arc is supplied by direct current, and the magnetic field generating coil in the tip of the electrode (not shown) is excited by direct current. Under such conditions, the arc rotates in one direction only, and has a force exerted thereon which is a function of the component of magnetic field strength extending radially across the tip times the arc current; depending on the density of fluid (gas) in the furnace, pressure, temperature, the presence or absence of vapor from the material being melted, and other factors well known to those skilled in the art, the arc after starting up quickly assumes a more or less uniform and sustained rate or rotation. The rotation of the arc from arcing surface 17 will periodically produce signals in the transducers or detector devices 61, 62 and 63, which three signals should have a symmetrical relationship if the arc is rotating normally. The circuit of device 67 may compare the time of the three signals applied thereto, and if the normal symmetry or normal time occurrence of the signals deviates, then time comparison circuit 67 produces a signal on leads 71 and 72 which is applied to utilization means 73, which was cut off the current which forms arc 19, not shown in FIG. 7 for convenience of illustration, or perform any other desired function.

Particular reference is made to FIG. 9 which shows a circuit, not per se part of the invention, which may form the comparison circuit shown in block form at 67 in FIG. 7. Other suitable circuits are available, and my invention is not limited to the circuit shown.

Transducers 61, 62 and 63 are spaced 120° from each other around the periphery of the electrode, near the arcing surface, or on the inside or outside diameter of the tip, or within the fluid passageway(s) of the electrode. Whereas the circuit is described with reference to transducers responsive to changes in magnetic field strength, other transducers described hereinbefore may be used; transducers responsive to light must be mounted external to the electrode; those responsive to sound are preferably mounted on the outside wall of the electrode to maximize the difference in sound intensities at the various transducers.

Transducers 61, 62 and 63 are shown delivering the signals induced therein to full wave rectifiers 171, 172 and 173 respectively, which may be dispensed with if not needed. It will be understood that because an arc is by nature dynamic and fluctuating, the signals at the transducers may not be perfectly defined notwithstanding the use of direct current to produce the arc. Band-pass filters having an adjustable band pass, adjusted in accordance with the speed of arc rotation, may be inserted in the output circuits of the transducers if desired, these not being shown for convenience of illustration.

Outputs of full wave rectifiers 171, 173 and 172 are applied to square wave generators 175, 176 and 177 respectively where the signals from the transducers are converted to substantially square wave pulses of uniform polarity with respect to ground 206. Outputs of square wave generators 175, 176 and 177 are applied to pulse stretchers 179, 180 and 181 respectively. Pulse stretchers are old in the art, having been described in the aforementioned work of Millman & Taub, and elsewhere in the published art. Pulse stretcher outputs have their leading edges substantially coinciding in time with the leading edges of the respective square waves applied thereto. Pulse stretcher 179 develops on lead 197 a stretched pulse having a duration at least as long as the time it takes the arc to travel from transducer 61 to transducer 62. Pulse stretcher 180 develops on lead 198 a stretched pulse having a duration at least as long as the time the arc to travel from transducer 63 to transducer 61. Pulse stretcher 181 develops a stretched pulse on lead 199 having a duration at least as long as the time it takes the arc to travel from transducer 62 to transducer 63.

The stretched pulses from pulse stretchers 179, 180 and 181 are used to charge the capacitors 188, 189 and 190 respectively of three RC timing circuits. Capacitor 188 is charged through resistor 185 and variable resistor 182; capacitor 189 is charged through resistor 186 and variable resistor 183; capacitor 190 is charged through resistor 187 and variable resistor 184. The terminals of the capacitors distant from ground 206 are connected by leads 194, 195, and 196 respectively to supply inputs to an OR-circuit 201 which supplies an output on lead 202 to transistor trigger circuit 203 which when triggered on supplies an input on lead 204 to bistable circuit 205 which sets the bistable 205 to state one. Trigger circuit 203 can be dispensed with if not needed. Only when one or more of the capacitors 188, 189, 190 are charged to at least a certain voltage will the voltages thereacross be sufficient to set the bistable to state one. None of the capacitors can be charged by a stretched pulse to this certain voltage in a time less than that it takes the arc to travel from one transducer to the next, and the time may be longer if desired. Only while bistable 205 is in state one is an output signal developed across leads 71 and 72 for application to utilization means 73 FIG. 7.

The heart of the circuit of FIG. 9 is a circuit arrangement whereby, as long as the transducer signals are symmetrical with respect to time, bistable 205 is never set and cannot be set to state one, and no output utilization signal is developed between leads 71 and 72. Leads 197, 198 and 199 apply the stretched pulses to differentiators 231, 233, and 232 respectively where the leading edges are differentiated producing pulses which are applied by leads 211, 213 and 212 respectively each having a circuit opening switch in series therein to OR-circuits 215, 217 and 216 respectively. At the same time, a pulse from differentiator 232 corresponding in time to the leading edge of the stretched pulse from transducer 62 is applied by lead 212a having a switch in series therein to OR-circuit 215; a pulse from differentiator 233 corresponding in time to the leading edge of the stretched pulse from transducer 63 is applied by way of lead 213a to OR-circuit 216; a pulse from differentiator 231 corresponding in time to the leading edge of the stretched pulse from transducer 61 is applied by way of lead 211a to OR-circuit 217. It is seen that OR-circuit 215 has pulses applied thereto resulting from signals at transducers 61 and 62 but not transducer 63; OR-circuit 216 has pulses applied thereto resulting from signals at transducers 62 and 63 but not transducer 61; OR-circuit 217 has pulses applied thereto resulting from signals at transducers 61 and 63 but not from transducer 62.

The pulse outputs of all of the differentiators are applied by leads each having a circuit-opening single pole-single throw switch in series therein to OR-circuit 209 which supplies a signal on lead 208 which reset bistable circuit 205 to state two, preventing the development of a utilization signal between leads 71 and 72. At the same time, the outputs of OR-circuits 215, 216, and 217 are applied by leads 221, 222, and 223 respectively to turn on transistor gates 193, 191, and 192 respectively which while gated on discharge capacitors 189, 188 and 190 respectively through a substantially zero impedance, reducing the charges or voltages thereon to substantially zero.

In summary, the outputs of all three transducers continually apply pulses to the bistable to keep it set to state two in which condition no utilization signal is produced between leads 71 and 72; at the same time signals from either transducer 62 and 63 are periodically applied to transistor gate 191 to prevent capacitor 188 from being charged to a voltage which would set bistable 205 to state one and produce a utilization signal output; signals from either transducer 61 and 62 are periodically applied to transistor gate 193 to prevent capacitor 189 from being charged to a voltage which would set bistable 205 to state one; signals from either transducer 61 and 63 are periodically applied to transducer gate 192 to prevent capacitor 190 from being charged to a voltage which would set bistable 205 to state one.

By way of further summary, no signal is applied to the utilization means 73 so long as the arc is rotating normally and the signals at transducers 61, 62, and 63 are symmetrical in time.

The circuit of FIG. 9 has been described with reference to its operation when all of the single-pole, single throw switches in all of the leads to the four OR circuits are closed.

It will be understood that it is generally desirable to supply a signal to the utilization means as quickly as possible after the arc stops rotating; if the arc spot remains fixed at one point on the arcing surface for the time duration of one cycle, if the arc current is large, severe damage may be done to the electrode and a pit formed therein. On the other hand, an arc is by nature dynamic and fluctuating; experimental studies have shown that where the magnetic field is large it bends the arc and the arc jumps from spot to spot on the arcing surface. Where such an operating condition exists, it may be desirable to have the comparison circuit of FIG. 9 put out a utilization signal only after the arc has passed two transducers without producing a signal in either. By opening the circuits of selected leads to the OR circuits and adjusting the charging times of the RC timing circuits such operation can be accomplished.

Where the circuit of FIG. 7 is used with an alternating current arc, it will be understood that filter means may be interposed in each of the lead means 64–84, 65–85 and 66–86 for eliminating 60 cycle components, ripple, etc.

Transducer 46 may be a strain gauge, which may employ a piezoelectric signal generating element, the strain on the electrode at any point varying with arc position. When a strain gauge is employed, background elimination circuit 150 may be dispensed with.

My invention includes the use of three electrodes in a three-phase alternating current circuit. Where three electrodes are employed, certain advantages may be desired by using those arc monitoring embodiments where the transducer is sealed and is mounted within a fluid passageway of an electrode.

The term "photocell" is employed herein in a generic sense to include photovoltaic and photoconductive light sensitive devices, it being within the skill of one working in the art to add a source of photocell current in FIG. 6 and to obtain from variations therein an output signal.

I claim as my invention:

1. In combination with an electrode adapted to have an arc therefrom produced to a surface of opposite polarity, the electrode including a tip portion forming a generally annular arcing surface and having means in the electrode mounted near the arcing surface for generating a magnetic field at the arcing surface of the electrode which exerts a force on the arc and causes the arc to move substantially continuously in time repetitive paths around a closed arc track formed by the generally annular arcing surface, transducer signal generating means mounted on or in the electrode at a preselected position on the electrode, the transducer signal generating means having a periodically occurring output signal produced therein as the arc travels around the closed track of the substantially annular arcing surface and passes close to the transducer means, comparison circuit means having the output signal from the transducer means applied thereto, the comparison circuit means including means for obtaining a time reference signal having a predetermined time duration, the comparison circuit means comparing the time reference signal with the occurrence of a signal from the transducer means and producing a comparison circuit means output signal when a signal from the transducer means does not occur at least once during the duration of the time reference signal, and utilization means operatively connected to the comparison circuit means to have the last-named output signal applied thereto as an input.

2. Apparatus according to claim 1 in which the arc is produced by direct current, and the comparison circuit means includes means for obtaining said time reference signal having a predetermined time duration.

3. Apparatus according to claim 1 in which the arc is produced by alternating current, and the alternating current source which produces the arc is applied to the comparison circuit means and utilized by the comparison circuit means to obtain said time reference signal having a predetermined time duration.

4. Arc rotation monitoring apparatus for an electrode having a generally annular arcing surface and a magnetic field coil therein for generating a magnetic field adjacent the arcing surface for exerting a force on the arc to cause the arc to move substantially continuously in a closed track around the arcing surface, a magnetic field responsive transducer mounted in predetermined position with respect to the arcing surface and having a signal induced therein by at least one of the arc current and current filaments in the electrode converging at the site of the arc spot on the arcing surface, the transducer producing a signal when one of said currents, passes close to the transducer, a comparison circuit, means applying the signal from the transducer to the comparison circuit, the comparison circuit including means for producing a time duration reference signal, the comparison circuit producing an output signal when the transducer does not produce at least one signal during the duration of the reference signal, and utilization means having said output signal applied thereto.

5. Apparatus according to claim 4 wherein the arc is produced by alternating current, and said alternating current is applied to the comparison circuit and utilized by the comparison circuit to produce said time duration reference signal.

6. Apparatus according to claim 4 wherein the arc is produced by direct current.

7. Apparatus according to claim 4 wherein the electrode has a fluid cooled arcing surface with a supporting column therefor having fluid passageways therein, and said transducer is sealed in a fluidtight manner and mounted in one of said fluid passageways.

8. Apparatus according to claim 4 wherein the transducer is mounted in the electrode above the magnetic field coil in the tip.

9. In combination with an electrode having an arc therefrom produced by alternating current from an alternating current source and having means for creating a magnetic field at the arcing surface of the electrode to rotate the arc, transducer signal generating means mounted on the electrode in predetermined position with respect to the path traveled by the arc as it rotates, the signal generating means having a periodically varying output signal produced therein by rotation of the arc, comparison circuit means having the varying output signal from the transducer means applied thereto and having a voltage applied thereto from the same alternating current source which supplies the arc current for comparing the occurrence of the signal from the transducer signal generating means with the alternations of the alternating current, the comparison circuit means producing a further output signal when the signal from the transducer signal generating means does not occur at least once during any alternation of the alternating current, and utilization means operatively connected to the comparison circuit means whereby said further output signal is applied to said utilization means.

10. Apparatus according to claim 9 in which the electrode is additionally characterized as having fluid-cooled arcing surface forming means and as having a supporting column portion including means forming fluid passageways, and in which the transducer signal generating means is fluid-proof and is mounted in one of said fluid passageways, the transducer signal generating means being mounted in predetermined position with respect to the path traveled by the arc as it rotates, the signal generating means having a periodically varying output signal produced therein by at least one of the rotation of the arc and the movement of current filaments within the electrode as they extend to the arc spot.

11. Arc rotation monitoring apparatus for an electrode having a generally annular arcing surface and a magnetic field coil therein for generating a magnetic field adjacent the arcing surface for exerting a force on the arc to cause the arc to move substantially continuously in a closed track around the arcing surface, a light-sensitive transducer mounted in predetermined position around the outer periphery of the electrode or within the inner periphery at least close the the arcing surface and generating a signal of increased amplitude when the arc reaches a position on the arcing surface whereat light from the arc shines directly on the light sensitive transducer, a comparison circuit, means applying the signal from the transducer to the comparison circuit, the comparison circuit including means for producing a time duration reference signal, the comparison circuit producing an output signal when the transducer does not produce at least one signal during the duration of the reference signal, and utilization means having said output signal applied thereto.

12. Arc rotation monitoring apparatus according to claim 11 wherein the arc is produced by alternating current, and said alternating current is applied to the comparison circuit and utilized by the comparison circuit to produce said time duration reference signal.

13. Arc rotation monitoring apparatus for an electrode having a generally annular arcing surface and a magnetic field coil therein for generating a magnetic field adjacent the arcing surface for exerting a force on the arc to cause the arc to move substantially continuously in a closed track around the arcing surface, a sound responsive transducer mounted at a predetermined axial, radial, and peripheral position in or on the electrode, the transducer producing an output signal which increases an intensity as the arc passes near thereto as the arc rotates, a comparison circuit, means for applying the signal from the transducer to the comparison circuit, the comparison circuit including means for producing a time duration reference signal, the comparison circuit producing an output signal when the transducer does not produce at least one signal during the duration of the reference signal, and utilization means having said output signal applied thereto.

14. Apparatus according to claim 13 in which the arc is produced by alternating current, and the alternating current is applied to the comparison circuit and used by the comparison circuit to produce the time duration reference signal.

15. Apparatus according to claim 13 in which the electrode has a fluid-cooled arcing surface, in which the electrode has a supporting column for the arcing surface with fluid flow passageways therein, and in which the sound responsive transducer is sealed in a fluidtight manner and mounted within a fluid passageway.

16. Apparatus according to claim 1 in which the transducer means is strain gauge means for producing a signal responsive to changes in strains in a predetermined portion of the electrode as the arc rotates.

17. In combination with an electrode adapted to be connected to a source of direct current potential to produce an arc therefrom to a surface of opposite polarity, the electrode including a supporting column portion and having arcing surface forming means and means for creating a magnetic field at the arcing surface of the electrode to rotate the arc, signal generating means including three similar transducers, all mounted on the electrode, the three transducers being substantially similarly spaced axially on the electrode and substantially equally spaced radially with respect to the axis of the electrode and circumferentially spaced substantially 120° from each other, each of the transducers having a periodically varying output signal produced therein by rotation of the arc, a time comparison circuit having lead means to each of the three transducers aNd having the output signals of the three transducers applied thereto, the time comparison circuit comparing the time difference between the occurrence of an output signal at any one of said transducers and the occurrence of output signals at the other two transducers and generating no time comparison circuit output signal while a substantially time-symmetrical pattern of signal generation occurs in the three transducers, the time comparison circuit generating an output signal when the signals from the three transducers are no longer symmetrical as to time and utilization means responsive to the output signal from the time comparison circuit.

18. Apparatus according to claim 17 in which the three transducers are additionally characterized as being means responsive to a change in magnetic field strength of a magnetic field generated by the arc current.

19. Apparatus according to claim 17 in which the three transducer signal generating means are additionally characterized as being light-sensitive devices responsive to variations in the intensity of light from the arc impinging thereon, the variations being caused by movement of the arc.

20. Apparatus according to claim 11 in which the transducer signal generating means is additionally characterized as being light-sensitive signal generating means mounted on the electrode at an axial position thereon to receive light directly from the arc when the arc rotates past a predetermined section of the arcing surface and to receive light only indirectly from the arc when the arc is attached to the arcing surface at a point not in said section, and background elimination means having the signal from the light-sensitive signal generating means applied thereto, the background elimination means being adapted to supply an output signal to said comparison circuit means.

21. Apparatus according to claim 20 in which the background elimination means has an adjustable threshold which may be adjusted in accordance with the intensity of the background illumination within the furnace, the background elimination means substantially eliminating from the signal the effects of light from molten material and incandescent vapors impinging on the light-sensitive signal generating means.

22. Apparatus according to claim 1 in which the transducer signal generating means is responsive to sound, and including in addition sound background elimination circuit means.

23. Apparatus according to claim 1 in which the transducer signal generating means is a strain gauge device mounted on the electrode, the strain on the electrode structure adjacent the device periodically reaching a limit in value when the arc rotates to a position whereat in most closely approaches the strain gauge device.

24. Apparatus according to claim 23 in which the strain gauge includes a piezoelectric signal generating element.

* * * * *